(12) United States Patent
Kassner

(10) Patent No.: US 7,124,017 B2
(45) Date of Patent: Oct. 17, 2006

(54) METHOD OF OPERATING AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 10/801,305

(22) Filed: Mar. 16, 2004

(65) Prior Publication Data

US 2004/0193361 A1 Sep. 30, 2004

(30) Foreign Application Priority Data

Mar. 17, 2003 (DE) ................................ 103 11 519

(51) Int. Cl.
*G01M 15/08* (2006.01)

(52) U.S. Cl. ........................... 701/114; 73/1.62; 73/115
(58) Field of Classification Search ................ 701/114, 701/34; 73/115, 1.59, 1.62
See application file for complete search history.

(56) References Cited

U.S. PATENT DOCUMENTS 6,684,151 B1 * 1/2004 Ring ........................... 701/110

* cited by examiner

*Primary Examiner*—Andrew M. Dolinar

(57) ABSTRACT

A method of operating an internal combustion engine in which fuel is combusted during a working stroke in at least one combustion chamber includes determining by a pressure sensor a gas pressure acting in the combustion chamber during the working stroke, monitoring a plausibility of a measuring variable obtained from a signal of the pressure sensor, determining, of a plurality of actual operational variables of the internal combustion engine which are not based on the signal of the pressure sensor, a reference variable corresponding to the measuring variable, comparing the measuring variable with the reference variable, and by this comparison checking the plausibility of the signal of the pressure sensor and the measuring variable obtained from it; and also a computer program, an electrical storage medium, and a control and/or regulating device for carrying out the method are provided.

7 Claims, 3 Drawing Sheets

METHOD OF OPERATING AN INTERNAL COMBUSTION ENGINE

BACKGROUND OF THE INVENTION

The present invention relates to a method for operating an internal combustion engine.

More particularly, it relates to a method of operation of an internal combustion engine, in which the fuel is burned during a working stroke in at least one combustion chamber, a gas pressure which is generated during a working stroke in the combustion chamber is detected by a pressure sensor, and the plausibility of a measuring variable obtained form the signal of the pressure sensor is monitored.

Such a method is known on a market. A pressure sensor is provided in an internal combustion engine in at least one cylinder and measures the actually acting gas pressure in the combustion chamber of the cylinder. With the variables derived from the gas pressure, it is possible to obtain knowledge about the course and the quality of the combustion of the fuel in the combustion chamber. This knowledge can be used for an optimization of the control of the combustion engine, in particular with respect to the fuel consumption, the emission behavior and the running quietness.

The used pressure sensors are however extremely subjected to temperature and pressure loads. Therefore, a complex mechanical design is needed to uncouple an evaluating electronic unit of the pressure sensor from a receiver, which is arranged directly on the combustion chamber of the cylinder of the internal combustion engine. Therefore, it can not be excluded that such a pressure sensor fails. In order to recognize a failure, the plausibility of the signal of the pressure sensor is monitored. For this purpose, in the known methods rigid limiting values are defined, and when the signal is below or above the limiting value, a conclusion about an error of the pressure sensor is made. For example, a failure of the pressure sensor is recognized when the sensor signal during the operation of the internal combustion engine indicates zero volt.

SUMMARY OF THE INVENTION

Accordingly, it is an object of the present invention to provide a method for operation of an internal combustion engine, in which a faulty pressure sensor is identified more reliably and therefore the operation of the internal combustion engine can be performed in a more reliable way.

In keeping with these objects and with others which will become apparent hereinafter, one feature of the present invention resides, briefly stated, in a method of operating an internal combustion engine in which fuel is combusted during a working stroke in at least one combustion chamber, comprising the steps of determining by a pressure sensor a gas pressure acting in the combustion chamber during the working stroke; monitoring a plausibility of a measuring variable obtained from a signal of the pressure sensor; determining, from a plurality of actual operational variables of the internal combustion engine which are not based on the signal of the pressure sensor, a reference variable corresponding to the measuring variable; comparing the measuring variable with the reference variable; and by this comparison checking the plausibility of the signal of the pressure sensor and the measuring variable obtained from it.

In accordance with the present invention, on the basis of a plurality of actual operational variables of the internal combustion engine which are not based on the signal of the pressure sensor, a reference variable which corresponds to the measuring variable is determined, the measuring variable is compared with the reference variable, and by means of this comparison the plausibility of the signal of the pressure sensor is verified.

With the inventive method it is possible to recognize such an error during the determination of the gas pressure in a combustion chamber of the internal combustion engine, which can not be detected by the previously used rigid limited value monitoring in principle. Such errors include for example amplification errors, or in other words a deviation of a proportionality factor between the pressure and the output signal of the pressure sensor. Further, such errors include a drift error, or in other words a superposition of the output signal with a time-dependent error variable. Also, a hysteresis caused by changed mechanical properties in the force transmission of the pressure sensor can be now discovered with the inventive method. Thermoshock conditions or in other words pressure signals produced by thermal stresses which have no correspondence with gas pressure, can be discovered now due to the inventive method. Furthermore, because of the invention it is now possible to detect non-linear errors which can be caused by deposits, for example of combustion residues on mechanical components of a pressure sensor.

This is all possible since the measuring variables which are obtained from the actual signal of the pressure sensor are compared with a physically corresponding reference variable, which is obtained by an numerical process of a completely different type on the basis of operational variables which correspond to the actual operation point of the internal combustion engine. Finally, a measuring variable which is based on a measurement is compared with a reference variable calculated on the basis of the actual operational conditions. This permits to recognize individualy the different error influences which can lead to an erroneously determined gas pressure, and also to recognize a super position of individual errors resulting in an unknown total error. In general, the reliability of the gas pressure value derived from the signal of the pressure sensor is increased, which improves the fuel consumption, the emission behavior and the running quietness of the internal combustion engine.

It is especially advantageous when in accordance with a further embodiment of the present invention a time course of the measuring variable and the reference variable within a working stroke is determined, and the both courses are compared with one another. In this manner, an erroneous pressure value obtained on the basis of the signal of the pressure sensor can be recognized better.

In accordance with a further embodiment of the present invention the maximum deviation of the measuring value from the reference value is determined and compared with at least one limiting value. This is easy to realize and reduces the memory and calculation requirements.

It is also possible that the deviation of the measuring value from the reference value is determined on the corresponding same time locations of the both courses, and from them a sum value is formed, and then the sum value is compared with at least one limiting value. This allows also the detection of quantitatively smaller error which however is more or less constant during a working stroke. In order to avoid a compensation of positive deviations by negative deviations, for forming the sum value either the absolute value of the deviations or the square of the deviations are utilized.

When depending on the results of the plausibility testing an inputting in an error storage is performed and/or an information is outputted to a consumer of the internal combustion engine, counter measures can be timely applied, so that damages to the internal combustion engine by a pressure sensor which supplies erroneously pressure values within a non-permissible range can be avoided.

The reliability of the plausibility testing is further improved when the comparison of the measuring variable with the reference variable is performed for a plurality of working strokes and a non-plausibility of the signal of the pressure sensor or of the measuring variable derived from is recognized when the comparison over a predetermined number of working strokes led to a corresponding result. It is thereby avoided that for example in the event of only one non-permissible deviation of the measuring value from the reference value it is already indicated that the pressure sensor operates erroneously, and the reliability of the diagnosis is increased.

In accordance with a preferable embodiment of the inventive method, the measuring variable and the reference variable are each a heat quantity, which is normalized to the heat quantity which is supplied as a whole during a working stroke, and the measuring variable is determined from the signal of the pressure sensor on the basis of thermodynamic equations while the reference variable is determined by means of a vibe-function. The vibe-function comes from the concept that the combustion of the hydrocarbons is performed in form of a chain reaction. A computation model can be produced from it, which is computed as a vibe-function. This describes the important features of a motor combustion with only three parameters as a whole. The vibe-function is very simple to program, and the reference variable is obtainable very fast with low computation expenses.

The above mentioned objective of the present invention is also achieved with a computer program which is programmed for use in a method of the above mentioned type. The same is true also for an electrical storage medium for a control-and/or regulating device of an internal combustion engine, in which a computer program for the use in a method disclosed herein above is stored. Finally, the objective of the present invention is also achieved by a control-and/or regulating device for an internal combustion engine, which is programmed for the use in a method described herein above.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
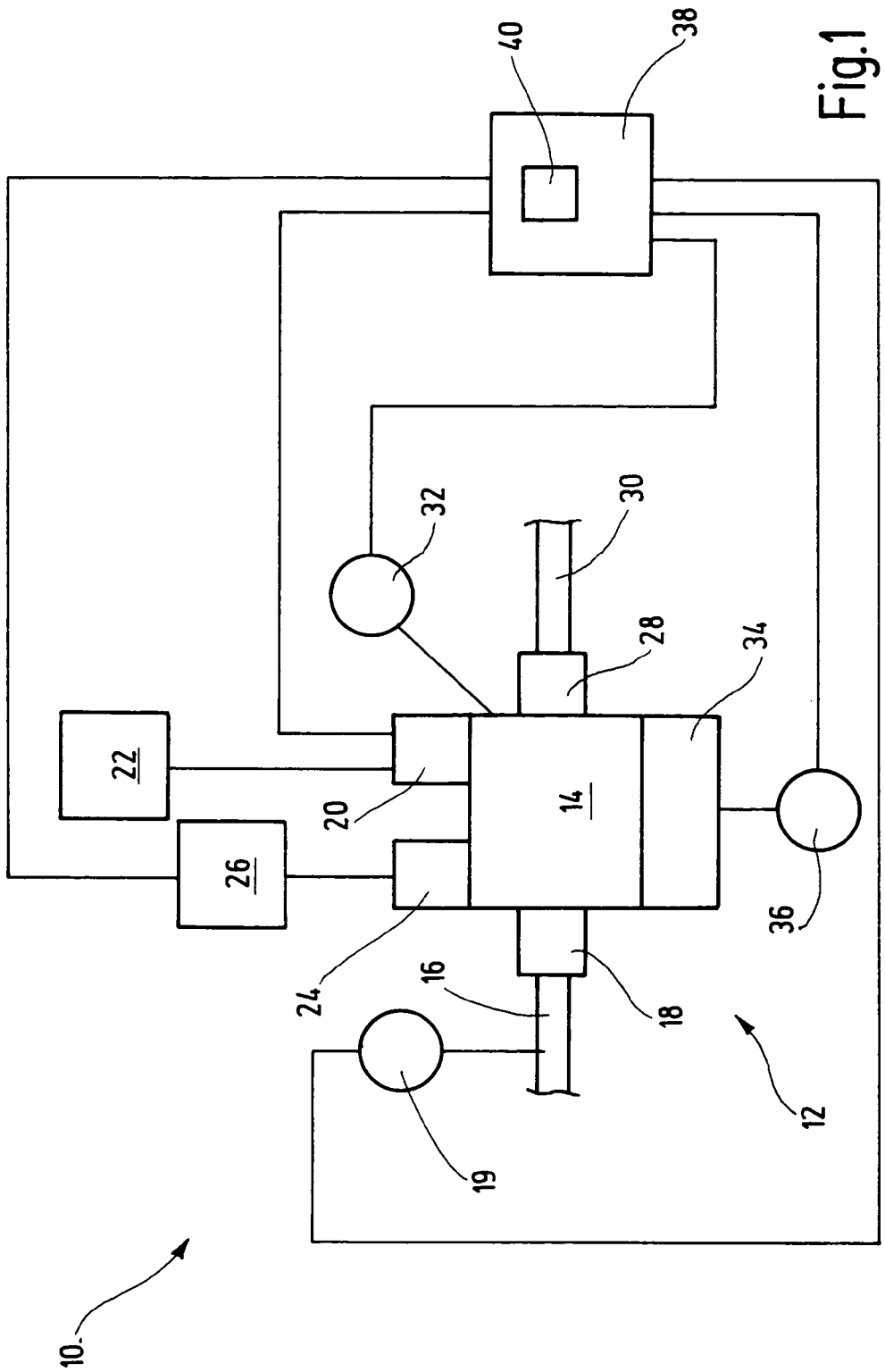
FIG. 1 is a view schematically showing an internal combustion engine with a pressure sensor.

An internal combustion engine shown in FIG. 1 is identified as a whole with reference numeral 10. It includes several cylinders, and FIG. 1, for the sake of clarity of illustration, shows only one cylinder which is identified with reference numeral 12. The cylinder 12 has an internal combustion chamber 14. Fresh air is supplied to the combustion engine 14 through a supply pipe 16 and an inlet valve 18. The supply air mass is detected by an HFM sensor 19. Fuel is introduced into the combustion chamber 14 through an injector 20 and a fuel system 22. A fuel-air mixture in the combustion chamber 14 is ignited by an spark plug 24 which is supplied with power from an ignition system 26.

The combustion exhaust gasses are withdrawn from the combustion chamber 14 through an outlet valve 18 and into an exhaust pipe 30. The pressure of the gas enclosed in the combustion chamber 14 during a working stroke is detected by a pressure sensor 32. During the operation of the internal combustion engine 10 a crankshaft 34 is set in rotation. Its angular position is detected by an angle sensor 36.

The operation of the internal combustion chamber is controlled or regulated by a control- and regulating device 38. It receives signals from the HFM sensor 19, from the pressure sensor 32, and from the angle sensor 36. It controls among others the ignition system 26, the injection 20 and a throttle flap which is not shown in FIG. 1 and arranged in the supply pipe 16. In this way the rotary speed and the torque of the internal combustion 10 can be adjusted depending on a desire of a user of the internal combustion engine 10. Simultaneously the control and regulation of the internal combustion 10 is performed so that in operation it consumes as little fuel as possible, produces as little emissions as possible, and has an optimal running quietness.

Figure 2:
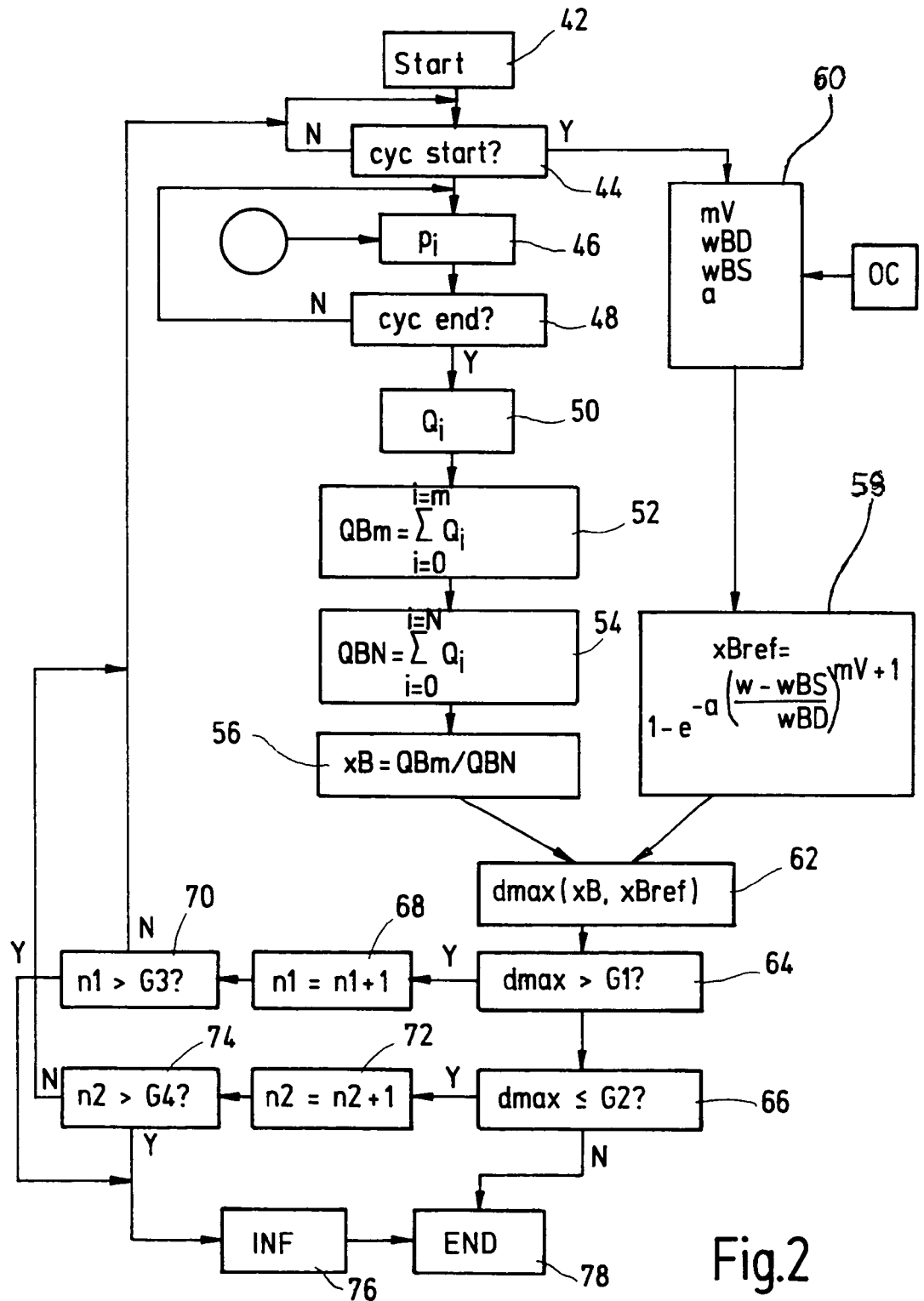
FIG. 2 is a view showing a flow diagram which illustrates a plausibility testing of the pressure sensor of FIG. 1.
Figure 3:
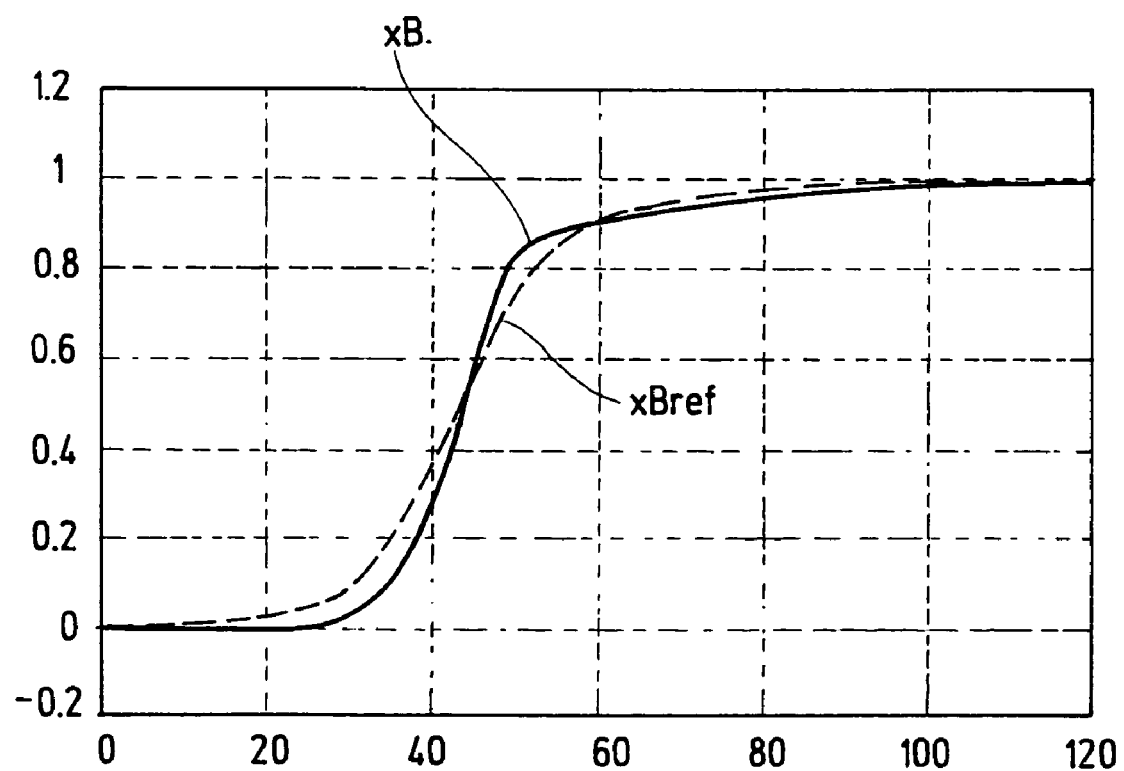
FIG. 3 is a view showing a diagram, in which the course of a measuring variable and a reference variable is plotted over an angle of a crankshaft of the internal combustion of FIG. 1.

A central role for these adjustments is the knowledge of the course and the quality of the combustion of the fuel-air mixture which takes place in the combustion chamber 14 during a working stroke. An important operational variable for this is the gas pressure, which acts during a working stroke in the combustion chamber 14 and is detected by the pressure sensor 32. For the operation of the internal combustion engine 10 it is important to reliably recognize whether the gas pressure determined from the signal of the pressure sensor 32 is erroneous. In order to recognize such an error, a method is proposed which is illustrated in FIG. 2. The method is also stored as a computer program in a storage (memory) 40 of the control- and regulating device 38.

After a start block 40, in a block 44 it is inquired whether a working stroke cyc already began. For this purpose the signals of the angle sensor 36 which detect the crank angle of the crankshaft 34, are evaluated. If the answer in the block 44 is "yes", then in constant angular distances of the crank angle of the crankshaft 34 the pressure values $p_i$ supplied from the pressure sensor 32 are received and stored in a block 46. The index i at the beginning of a working stroke cyc=0 and reaches at the end of the work stroke cyc a maximum value N. In a block 48 it is finally inquired whether the working stroke cyc already ended. If the answer in the block 48 is "yes", then the testing and storing of the pressure value $p_i$ ends.

From the stored pressure values $p_i$, in a block 50 a so-called "heating course" is determined. This gives expression for conversion of the fuel quantity injected in the combustion chamber 14 by the injector 20 into a heat energy Qi and depends among others on polytrope exponent n, as well as on cylinder volume $C_i$ and on gas pressure $p_i$. The polytrope exponent n depends on the operation type of the internal combustion engine 10 and is known to the control- and regulating device 38. The cylinder volume $V_i$, based on the position of the crankshaft 34 which is picked up by the angle sensor 36, can be determined for the cylinder 12. The corresponding equation for determination of the supplied heat quantity $Q_i$ is as follows:

$$Q_i = \frac{n}{n-1} * p_i * (V_{i+1} - V_{i-1}) + \frac{1}{n-1} * V_i * (p_{i+1} - p_{i-1})$$

The basis for this equation is the first law of thermodynamics.

From the heat course $Q_i$, in a block 52 by means of forming a sum of the energy conversion QBm obtained at a corresponding time point m is determined. Furthermore, in a block 54 the total energy conversion QBN obtained during the observed working stroke is determined.

In a valve 56, the energy conversion QBM obtained at the corresponding time point m(actually: angular positions of the crankshaft 34) is normalized by means of the total energy consumption QBN, and from it a variable xB is formed, which represents a normalized course of the energy consumption in the combustion chamber 14 during a working stroke cyc, and in particular on the basis of the signals of the pressure sensors 32. The variable xB is identified as a "measuring variable", since it is based on the measuring signals of the pressure sensors 32. The course of the measuring value xB is illustrated in FIG. 2 by a solid line over the crank angle of the crankshaft 34.

A central point of the method shown in FIG. 2 is the comparison of the course of the measuring variable xB determined in 56 with a reference variable xBref which physically corresponds to the measuring value xB, but is obtained in a method in which the signals of the pressure sensors 32 have no influence. For this purpose the so-called "vibe function" is utilized, which is based on the concept that the combustion of the hydrocarbon material in the combustion chamber 14 is performed in form of a chain reaction. Starting from this and from reaction-kinetic considerations on a homogenous fuel-air mixture, the so-called burn out function xBref is obtained.

$$xBref = 1 - e^{-a*\left(\frac{w-wBS}{wBD}\right)^{mV+1}}$$

This function is calculated in FIG. 2 in a block 58. The coefficients required for the calculation are obtained or provided in a block 60.

The coefficient mV is a so-called vibe coefficient. It is determined in a laboratory research for different operational points of the internal combustion engine 10. There is a possibility that for example in one such laboratory research a pressure course for one operational point is measured guaranteed as error-free, and from it the real combustion course is determined. By graphic determination processes for example double logarithmizing process of the real combustion course, the vibe parameter mV can be determined. It is to be understood that for different operational conditions OC of the internal combustion 10, the corresponding parameter of the vibe-function xBref can be stored in the control- and regulating device 38.

A parameter wBS identifies such crank angle of the crankshaft 34, with which the combustion of the fuel-air mixture enclosed in the combustion chamber 15 begins. This value conventionally can be determined from the ignition angle, or in other words such angle of the crankshaft 20 at which the spark plug 24 ignites. A parameter wBd identifies the combustion period during the working stroke cyc. It can be determined by the control- and regulating device 38 with knowledge of the injected fuel quantity as well as the air filling detected by the HFM sensor 19, as well as in some times on the basis of further operational variables of the internal combustion engine 10. The coefficient a is produced from the conversion degree of the fuel during the combustion. When it is taken as being close to 99.9%, a coefficient a of 6.903 is obtained.

In 58 the reference variable xBref is calculated with the parameters corresponding to the actual operation conditions OC. The corresponding curve of the vibe function xBref is shown in FIG. 2 in a broken line.

In a block 62 the maximum deviation dmax of the course of the measuring variable xB from the course of the reference variable xBref is determined. In a block 64 it is inquired whether the maximum deviation dmax determine in the block 62 is greater than a limiting value G1. If the answer in the block 64 is "no", then in a block 66 it is inquired whether the deviation dmax is smaller than or equal to a second limiting value G2. By the inquiries in the block 64 and 66, unpermissible deviations above and below of the measuring variable xB from the reference variable xBref are determined.

If the answer in the block 64 is "yes", then in a block 68 a numerical value n1 is increased by 1. Subsequently, in a block 70 it is inquired whether the numerical value n1 is greater than a limiting value G3. If the answer in the block 70 is "no", a return to the beginning of the process is performed, so that the plausibility testing is carried out for a further working stroke cyc. Analogously, when the answer in the block 66 is "yes", in a block 72 a second numerical value n2 is increased by 1 and subsequently in a block 74 it is inquired whether the second numerical value n2 is greater than a limiting value G4. Analogously, a return to the beginning of the process is performed when the answer in the block 74 is "no".

If the answer either in the block 70 or in the block 74 is "yes" which equally means that with a fixed maximum number of the working strokes cyc a non-permissible great deviation dmax was determined, then in a block 76 an information is produced. It is composed on the one hand from an input in an error storage and on the other hand in the output of a tip to the user of the internal combustion 10. The method ends in a block 78.

It is to be understood that the maximum deviation dmax can also correspond to a sum of deviations on corresponding equal time locations of both courses xB and xBref, which in some cases can be also squared. In this case the inquiry in the block 66 and in the dependent blocks 72 and 74 can be dispensed with.

The method for testing of the pressure sensor described herein above was presented with respect to a pressure sensor 22 of the cylinder 12. It is to be understood that in a multi-cylinder internal combustion engine, a corresponding plausibility testing can be performed for the pressure sensors of other cylinders. The plausibility testing can be performed in regular time intervals or for example each time when the internal combustion engine 10 is operated directly in a predetermined operational point, which is described conventionally by the rotary speed, the air filling, the quantity of the injected fuel, and the ignition angle.

It will be understood that each of the elements described above, or two or more together, may also find a useful application in other types of methods and constructions differing from the types described above.

While the invention has been illustrated and described as embodied in method of operating an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method of operating an internal combustion engine in which fuel is combusted during a working stroke in at least one combustion chamber, comprising the steps of determining by a pressure sensor a gas pressure acting in the combustion chamber during the working stroke; monitoring a plausibility of a measuring variable obtained from a signal of the pressure sensor; determining, from a plurality of actual operational variables of the internal combustion engine, which are not based on the signal of the pressure sensor, a reference variable corresponding to the measuring variable; comparing the measuring variable with the reference variable; and by this comparison checking the plausibility of the signal of the pressure sensor and the measuring variable obtained from it, further comprising determining time courses of the measuring variable and the reference variable within one working stroke and comparing the both courses with one another, and determining a deviation of the measuring variable from the reference variable in equal time locations of the both courses, forming a sum value from said deviation; and comparing the sum value with at least one limiting value.

2. A method as defined in claim 1; and further comprising determining a maximum deviation of the measuring variable from the reference variable and comparing the maximum deviation with at least one limiting value.

3. A method as defined in claim 1; and further comprising, depending on a result of the plausibility checking, performing a step selected from the group consisting of an input in an error storage, an information to a consumer of the internal combustion engine, and both.

4. A method as defined in claim 1; and further comprising performing the comparing of the measuring valuable with the reference valuable for a plurality of working strokes; and recognizing a non-plausibility of the signal of the pressure sensor or the measuring value derived from it when the comparing during a predetermined number of the working strokes leads to a corresponding result.

5. A method of operating an internal combustion engine in which fuel is combusted during a working stroke in at least one combustion chamber, comprising the steps of determining by a pressure sensor a gas pressure acting in the combustion chamber during the working stroke; monitoring a plausibility of a measuring variable obtained from a signal of the pressure sensor; determining, from a plurality of actual operational variables of the internal combustion engine, which are not based on the signal of the pressure sensor, a reference variable corresponding to the measuring variable; comparing the measuring variable with the reference variable; and by this comparison checking the plausibility of the signal of the pressure sensor and the measuring variable obtained from it, further comprising using as the measuring variable and the reference variable correspondingly a heat quantity which is normalized on a heat quantity supplied as a whole during a working stroke; determining the measuring variable from the signal of the pressure sensor on a basis of thermodynamic equations; and determining the reference variable by means of a vibe function.

6. An electrical storage medium for a device of an internal combustion engine selected from the group consisting a control device, a regulating device, and both, the electrical storage medium storing a computer program to perform a method of operating an internal combustion engine in which fuel is combusted during a working stroke in at least one combustion chamber, comprising the steps of determining by a pressure sensor a gas pressure acting in the combustion chamber during the working stroke, monitoring a plausibility of a measuring variable obtained from a signal of the pressure sensor, determining, from a plurality of actual operational variables of the internal combustion engine which are not based on the signal of the pressure sensor, a reference variable corresponding to the measuring variable, comparing the measuring variable with the reference variable; and by this comparison checking the plausibility of the signal of the pressure sensor and the measuring variable obtained from it, wherein the method further comprises determining time courses of the measuring variable and the reference variable within one working stroke and comparing the both courses with one another, and determining a deviation of the measuring variable from the reference variable in equal time locations of the both courses, forming a sum value from said deviation; and comparing the sum value with at least one limiting value.

7. A device for an internal combustion engine selected from the group consisting of a control device, a regulating device, and both, said device being programmed to perform a method of operating an internal combustion engine in which fuel is combusted during a working stroke in at least one combustion chamber, comprising the steps of determining by a pressure sensor a gas pressure acting in the combustion chamber during the working stroke; monitoring a plausibility of a measuring variable obtained from a signal of the pressure sensor; determining, on the basis of a plurality of actual operational variables of the internal combustion engine which are not based on the signal of the pressure sensor, a reference variable corresponding to the measuring variable; comparing the measuring variable with the reference variable; and by this comparison checking the plausibility of the sensor of the signal of the pressure sensor and the measuring variable obtained from it, the method further comprising determining time courses of the measuring variable and the reference variable within one working stroke and comparing the both courses with one another, and determining a deviation of the measuring variable from the reference variable in equal time locations of the both courses, forming a sum value from said deviation; and comparing the sum value with at least one limiting value.

* * * * *